US011336616B2

United States Patent
Zhuo et al.

(10) Patent No.: US 11,336,616 B2
(45) Date of Patent: May 17, 2022

(54) ADDRESS COMPETITION METHOD OF MULTI-CONNECTED TYPE CONTROL SYSTEM

(71) Applicants: Qingdao Haier Air-conditioning Electronic Co., Ltd, Shandong (CN); Haier Smart Home Co., Ltd., Shandong (CN)

(72) Inventors: Baitian Zhuo, Qingdao (CN); Bin Shi, Qingdao (CN); Shaojiang Cheng, Qingdao (CN); Ruigang Zhang, Qingdao (CN); Jun Wang, Qingdao (CN); Wenjun Shao, Qingdao (CN)

(73) Assignees: Qingdao Haier Air-Conditioning Electronic Co., Ltd, Qingdao (CN); Haier Smart Home Co., Ltd., Qingdao (CN)

( * ) Notice: Subject to any disclaimer, the term of this patent is extended or adjusted under 35 U.S.C. 154(b) by 0 days.

(21) Appl. No.: 17/042,435

(22) PCT Filed: Jan. 21, 2019

(86) PCT No.: PCT/CN2019/072554
§ 371 (c)(1),
(2) Date: Sep. 28, 2020

(87) PCT Pub. No.: WO2019/184564
PCT Pub. Date: Oct. 3, 2019

(65) Prior Publication Data
US 2021/0126895 A1  Apr. 29, 2021

(30) Foreign Application Priority Data
Mar. 30, 2018 (CN) .......................... 201810294433.0

(51) Int. Cl.
*H04L 61/5038* (2022.01)
*F24F 11/30* (2018.01)
*H04L 61/5092* (2022.01)

(52) U.S. Cl.
CPC .......... *H04L 61/2038* (2013.01); *F24F 11/30* (2018.01); *H04L 61/2092* (2013.01)

(58) Field of Classification Search
CPC .. H04L 61/2038; H04L 61/2092; F24F 11/30; G06F 13/4291; G06F 2213/0016; G06F 2213/0052
See application file for complete search history.

(56) References Cited

U.S. PATENT DOCUMENTS

| | | | | | |
|---|---|---|---|---|---|
| 4,700,230 A | * | 10/1987 | Pshtissky | ............... | H04N 5/268 348/159 |
| 9,451,543 B2 | * | 9/2016 | Lei | ..................... | H04W 52/0219 |

(Continued)

FOREIGN PATENT DOCUMENTS

| | | |
|---|---|---|
| CN | 101852472 A | 10/2010 |
| CN | 103036754 A | 4/2013 |

(Continued)

OTHER PUBLICATIONS

International Search Report dated Apr. 19, 2019 in corresponding International Application No. PCT/CN2019/072554; 4 pages.

*Primary Examiner* — Todd L Barker
(74) *Attorney, Agent, or Firm* — Maier & Maier, PLLC

(57) ABSTRACT

An address competition method of a multi-connected type control system. The method aims at solving the problem of how to set an indoor machine communication address in the multi-connected type air conditioner system efficiently. For the purpose, a primary control device (such as an air conditioner outdoor machine) performs broadcasting on each address in a preset address section in sequence. A slave control device (such as the air conditioner indoor machine)

(Continued)

responds to the primary control device on the basis of preset responding time and the number of currently broadcasting times of the primary control device. The primary control device to which a communication address is distributed temporarily is responded so as to finish address competition rapidly. Meanwhile, the primary control device can perform continuous broadcasting on one address for repeatedly, so that the competition success rate of the address is increased.

8 Claims, 2 Drawing Sheets

(56) References Cited

U.S. PATENT DOCUMENTS

| | | | |
|---|---|---|---|
| 2006/0148402 A1* | 7/2006 | Hagiwara | H04L 63/08 455/41.1 |
| 2006/0195639 A1* | 8/2006 | Yang | G06F 13/4291 710/110 |
| 2012/0005296 A1* | 1/2012 | Lint | A61C 1/0023 709/208 |
| 2015/0358780 A1* | 12/2015 | Saari | H04W 4/02 370/252 |
| 2016/0092388 A1* | 3/2016 | Sorenson | G06F 13/4068 710/110 |
| 2017/0373821 A1* | 12/2017 | Arakawa | G06F 13/42 |
| 2018/0284710 A1* | 10/2018 | Abe | G06F 16/217 |
| 2019/0020433 A1* | 1/2019 | Pitigoi-Aron | H04W 56/0055 |
| 2019/0042526 A1* | 2/2019 | Srivastava | G06F 13/364 |
| 2019/0219294 A1* | 7/2019 | Dutt | F24F 11/64 |
| 2020/0192843 A1* | 6/2020 | Fuchs | G06F 21/606 |

FOREIGN PATENT DOCUMENTS

| | | |
|---|---|---|
| CN | 105546730 A | 5/2016 |
| CN | 108521474 A | 9/2018 |
| WO | 2011/027587 A1 | 3/2011 |

\* cited by examiner

ADDRESS COMPETITION METHOD OF MULTI-CONNECTED TYPE CONTROL SYSTEM

FIELD

The present disclosure relates to the technical field of multi-connection air-conditioner control; specifically, the present disclosure relates to an address competition method of a multi-connection control system.

BACKGROUND

Each outdoor unit in a multi-connection air conditioning system may interactively communicate with multiple indoor units. In order to ensure that the outdoor unit can reliably communicate with each indoor unit, it is necessary to set a unique communication address for each indoor unit in advance. Currently, methods such as manual setting or automatic allocation may be used to set the communication addresses of the indoor units. Specifically, in the manual setting method, an operator sets the communication address of each indoor unit one by one before the multi-connection air conditioning system is started. This method has high reliability, but is not suitable for batch setting of indoor unit addresses. In the automatic allocation method, the outdoor unit automatically allocates a communication address to each indoor unit during the startup of the multi-connection air conditioning system. Although this method can alleviate a workload of the operator, it still cannot quickly complete the batch setting of indoor unit addresses due to the limitation of bus mediation time.

Chinese patent application with publication No. CN105546730A discloses an automatic addressing method of a multi-connection air conditioner indoor unit. In this method, the outdoor unit sequentially broadcasts indoor units in communication with a bus according to the order of addresses; the indoor unit obtains its own address through an address management module. When the address is the same as the address broadcasted by the outdoor unit, a competition time thereof to participate in address competition is first determined according to its priority and random number (the competition time of each indoor unit is different). Then, the indoor unit participates in the address competition according to the competition time. If the competition succeeds, the current address is bound to the local machine, and if the competition fails, the local address is set as a vacant address. In this process, two operations of "indoor unit address judgment" and "indoor unit address competition" must be executed in sequence before the address is successfully allocated, which will inevitably increase the bus mediation time, so this method also cannot quickly complete batch configuration of indoor unit addresses.

SUMMARY

In order to solve the above-mentioned problem in the related art, that is, to solve the technical problem of how to efficiently set communication addresses of indoor units in a multi-connection air conditioning system, the present disclosure provides an address competition method of a multi-connection control system. The multi-connection control system includes a master control device and a plurality of slave control devices, and the master control device is connected with the plurality of slave control devices respectively; wherein the address competition method includes the following steps:

sequentially broadcasting, by the master control device, each address in a preset address segment by sending address broadcasting signals to the slave control devices;

responding to, by all the slave control devices, the master control device according to a preset response time and the current number of broadcasting times of the master control device; and in a case where only one slave control device responded successfully, allocating an address specified by the address broadcasting signal as a communication address to the slave control device that responded successfully;

wherein the preset response time depends on whether the corresponding slave control device has been temporarily allocated a communication address.

Further, in a preferred technical solution provided by the present disclosure:

the "responding to, by all the slave control devices, the master control device according to a preset response time and the current number of broadcasting times of the master control device" includes:

generating a random number by each slave control device upon receiving the address broadcasting signal, and sending the generated random number by each slave control device to the master control device.

Further, in a preferred technical solution provided by the present disclosure:

the master control device performs multiple times of consecutive broadcastings on each address in the preset address segment; or the master control device performs consecutive broadcastings on corresponding addresses only when multiple slave control devices responded successfully or all the slave control devices failed to respond during a first broadcasting.

Further, in a preferred technical solution provided by the present disclosure:

a method of obtaining a response time of the slave control device in the first broadcasting includes:

judging whether the slave control device has been temporarily allocated a communication address: if yes, the response time is a time point delayed by a time $T_1$ from when it is detected that a communication bus is idle; and if not, the response time is a time point delayed by a time $T_2$ from when it is detected that the communication bus is idle, wherein $T_1 < T_2$.

Further, in a preferred technical solution provided by the present disclosure:

when the master control device performs multiple times of consecutive broadcastings on each address in the preset address segment, a method of obtaining a response time of the slave control device in a non-first broadcasting includes:

if one slave control device responded successfully in a previous broadcasting, the response time of the slave control device that responded successfully is a time point delayed by a time $T_{10}$ from when it is detected that the communication bus is idle, and the response time of the slave control devices that failed to respond is a time point delayed by a time $T_{20}$ from when it is detected that the communication bus is idle, wherein $T_{10} < T_{20}$;

if multiple slave control devices responded successfully in the previous broadcasting, the response time of the slave control devices that responded successfully is a time point delayed by a time $T_{100}$ from when it is detected that the communication bus is idle, and the response time of the slave control devices that failed to respond is a time point delayed by a time $T_{200}$ from when it is detected that the communication bus is idle, wherein $T_{100} < T_{200}$; and if all the slave control devices failed to respond in the previous broadcasting, the response time of the slave control devices is the respective response time in said previous broadcasting.

Further, in a preferred technical solution provided by the present disclosure:

when the master control device performs consecutive broadcastings on corresponding addresses only when multiple slave control devices responded successfully or all the slave control devices failed to respond during the first broadcasting, a method of obtaining a response time of the slave control device in a non-first broadcasting includes:

if multiple slave control devices responded successfully in a previous broadcasting, the response time of the slave control devices that responded successfully is a time point delayed by a time $T_{110}$ from when it is detected that the communication bus is idle, and the response time of the slave control devices that failed to respond is a time point delayed by a time $T_{210}$ from when it is detected that the communication bus is idle, wherein $T_{110}<T_{210}$; and if all the slave control devices failed to respond in the previous broadcasting, the response time of the slave control devices is the respective response time in said previous broadcasting.

Further, in a preferred technical solution provided by the present disclosure:

when the master control device performs multiple times of consecutive broadcastings on a certain address in the preset address segment, the address competition method further includes:

obtaining an address category of each slave control device; and determining a response time of each slave control device in the current broadcasting according to the obtained address category;

wherein the address category includes a first address category, a second address category and a third address category; the first address category indicates that the slave control device has been permanently allocated a communication address and therefore no longer participates in broadcast responding; the second address category indicates that multiple slave control devices responded successfully in the multiple times of consecutive broadcastings and are therefore temporarily allocated communication addresses; and the third address category indicates that no slave control device responded or the slave control devices failed to respond during the multiple times of consecutive broadcastings.

Further, in a preferred technical solution provided by the present disclosure:

the step of "determining a response time of each slave control device in the current broadcasting according to the obtained address category" includes: setting the response time of the slave control device of the second address category to be shorter than the response time of the slave control device of the third address category.

Further, in a preferred technical solution provided by the present disclosure:

the address competition method further includes:

if the master control device has performed multiple times of consecutive broadcastings on a certain address in the preset address segment, but eventually all the slave control devices failed to respond, broadcasting the next address according to a set sequence.

Further, in a preferred technical solution provided by the present disclosure:

the address competition method further includes:

when the master control device performs multiple times of consecutive broadcastings on a certain address in the preset address segment, if the number of successful responding of the same slave control device is greater than a preset threshold and the address has been initially allocated to the slave control device, setting a status flag of the slave control device as a device presence flag.

As compared with the closest related art, the above technical solutions have at least the following advantageous effects:

1. In the present disclosure, the master control device can sequentially broadcast each address in the preset address segment, and the response time of the slave control device can be determined according to whether it has been temporarily allocated a communication address (for the brevity of description, "the slave control device that has been temporarily allocated a communication address" will be referred to as the first device, and "the slave control device that has not been temporarily allocated a communication address" will be referred to as the second device in the following), so that the slave control device can respond to the master control device according to the determined response time. The response time of the first device is shorter than the response time of the second device, and the first device can preferentially respond successfully. However, the number of first devices is often small. Therefore, the present disclosure can reduce the bus mediation time during the competition for each address, thereby greatly reducing the bus mediation time when the batch slave control devices compete for addresses, and improving the address allocation speed of the entire system.

2. In the present disclosure, the master control device may perform multiple times of consecutive broadcastings on each address in the preset address segment, and it may also perform consecutive broadcastings on corresponding addresses only when multiple slave control devices responded successfully or all the slave control devices failed to respond during the first broadcasting. In the non-first broadcasting of these two broadcasting schemes, the response time of the slave control device in the current broadcasting can be determined according to the response result of the slave control device in the previous broadcasting, thus ensuring that the slave control device that successfully responded in the previous broadcasting can respond preferentially in the current broadcasting, and reducing the time consumption in the competition for the current address, so that the master control device can quickly complete address allocation.

3. In the present disclosure, the master control device can perform multiple times of consecutive broadcastings on a certain address in the preset address segment; especially when all the slave control devices failed to respond in the first broadcasting, the master control device can perform consecutive broadcastings on the current address, which can improve the success rate of the competition for the address.

4. In the present disclosure, the slave control device can generate a random number immediately after receiving the address broadcasting signal, and send the generated random number to the master control device for responding. By responding on the basis of the random number, a responding difference of each slave control device can be increased. When the random numbers of multiple slave control devices are the same, the current address can also be consecutively broadcasted for multiple times to obtain the only slave control device that responded successfully, thereby ensuring that the competition for the current address is successful.

DETAILED DESCRIPTION

Preferred embodiments of the present disclosure will be described below with reference to the accompanying drawings. Those skilled in the art should understand that these embodiments are only used to explain the technical principles of the present disclosure, and are not intended to limit the scope of protection of the present disclosure.

First, it should be noted that the multi-connection control system in the present disclosure includes a master control device and a plurality of slave control devices, and each master control device is connected with the plurality of slave control devices respectively. In addition, the master control device communicates with the slave control devices connected thereto using a master-slave bus communication method (i.e., the master control device serves as the master machine, and the slave control devices serve as the slave machines). For example, the multi-connection control system may be a multi-connection air-conditioning system, in which an outdoor unit of the air conditioner is connected to multiple indoor units of the air conditioner, and the outdoor unit communicates with all the indoor units of the air conditioner connected thereto using the master-slave bus communication method.

In the following, an address competition method of a multi-connection control system in this embodiment will be described with reference to the accompanying drawings.

Figure 1:
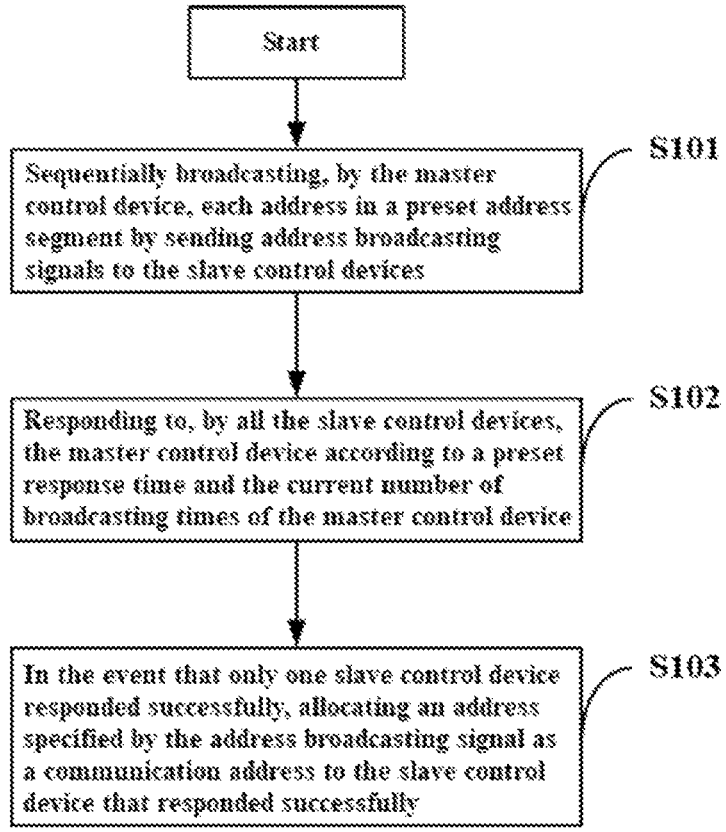
FIG. 1 is a schematic view showing main steps of an address competition method of a multi-connection control system in an embodiment of the present disclosure.

Reference is made to FIG. 1, which exemplarily shows main steps of the address competition method of the multi-connection control system in this embodiment. As shown in FIG. 1, the address competition method of the multi-connection control system in this embodiment may include the following steps:

Step S101: sequentially broadcasting, by the master control device, each address in a preset address segment by sending address broadcasting signals to the slave control devices.

In this embodiment, the preset address segment refers to an address segment composed of multiple consecutive addresses. For example, the preset address segment may include address 1, address 2, address 3, address 4, and address 5. For another example, the address segment can also include address 6, address 7, address 8, address 9, and address 10.

Specifically, in this embodiment, the master control device may perform multiple times of consecutive broadcastings on each address in the preset address segment to ensure that when the master control device communicates with the slave control devices normally, each address can be allocated successfully.

In order to improve the efficiency of address allocation, in this embodiment, it is also possible that corresponding addresses are consecutively broadcasted only when multiple slave control devices responded successfully or all the slave control devices failed to respond during a first broadcasting.

That is, after the competition for address succeeds, the master control device can broadcast the next address immediately or after waiting for a certain period of time, and the address is no longer broadcasted, thereby reducing the bus mediation time and improving the efficiency of address allocation.

In a preferred implementation of this embodiment, if the master control device has performed multiple times of consecutive broadcastings on a certain address in the preset address segment, but eventually all the slave control devices failed to respond, the next address may be broadcasted according to a set sequence. In this embodiment, in order to improve the success rate of the competition for this address, it is also possible to wait until all addresses are broadcasted and then rebroadcast the addresses to which the responding failed.

In another preferred implementation of this embodiment, when the master control device performs multiple times of consecutive broadcastings on a certain address in the preset address segment, if the number of successful responding of the same slave control device is greater than a preset threshold and the address has been initially allocated to the slave control device, a status flag of the slave control device is set as a device presence flag. In this embodiment, after the status flag of the slave control device is set as the device presence flag, it may no longer participate in the broadcast responding to the next address. The master control device may also perform new communication with the corresponding slave control device according to the device presence flag. For example, the master control device sends a status query command to the slave control device with the device presence flag, so that the slave control device can feedback status information to the master control device according to the status query command.

Step S102: responding to, by all the slave control devices, the master control device according to a preset response time and the current number of broadcasting times of the master control device.

Specifically, in this embodiment, the slave control device can respond to the master control device according to the following steps: generating a random number by the slave control device upon receiving the address broadcasting signal from the master control device, and sending the generated random number by each slave control device to the master control device. In a preferred implementation of this embodiment, the random number generated by the slave control device is a 2-byte random number composed of 16 digits, so that the difference of the random number can be improved.

It can be seen from the above that the master control device can perform multiple times of consecutive broadcastings on each address in the preset address segment (for the brevity of description, hereinafter referred to as broadcasting scheme 1), or it can also perform consecutive broadcastings on corresponding addresses only when multiple slave control devices responded successfully or all the slave control devices failed to respond during a first broadcasting (for the brevity of description, hereinafter referred to as broadcasting scheme 2). In this embodiment, different methods can be used to obtain the response time of the slave control device according to different broadcasting schemes. The methods of obtaining the response time of the slave control device will be separately described below.

1. For the first broadcasting of the master control device in "broadcasting scheme 1" and "broadcasting scheme 2", the response time depends on whether the corresponding slave control device has been temporarily allocated a communication address, and the response time of the slave control device can be specifically obtained according to the following steps: judging whether the slave control device has been temporarily allocated a communication address: if yes, the response time is a time point delayed by a time $T_1$ from when it is detected that a communication bus is idle; and if not, the response time is a time point delayed by a time $T_2$ from when it is detected that the communication bus is idle, wherein $T_1 < T_2$; for example, $T_1 = 10$ ms, and $T_2 = 20$ ms.

2. For the non-first broadcasting of the master control device in "broadcasting scheme 1", the response time of the slave control device can be obtained according to the following steps: determining the response time according to the response result of all the slave control devices in the previous broadcasting, specifically as follows.

If one slave control device responded successfully in the previous broadcasting, the response time of the slave control device that responded successfully is a time point delayed by a time $T_{10}$ from when it is detected that the communication bus is idle, and the response time of the slave control devices that failed to respond is a time point delayed by a time $T_{20}$ from when it is detected that the communication bus is idle, wherein $T_{10} < T_{20}$; for example, $T_{10} = 10$ ms, and $T_{20} = 20$ ms.

If multiple slave control devices responded successfully in the previous broadcasting, the response time of the slave control devices that responded successfully is a time point delayed by a time $T_{100}$ from when it is detected that the communication bus is idle, and the response time of the slave control devices that failed to respond is a time point delayed by a time $T_{200}$ from when it is detected that the communication bus is idle, wherein $T_{100} < T_{200}$; for example, $T_{100} = 15$ ms, and $T_{200} = 20$ ms.

If all the slave control devices failed to respond in the previous broadcasting, the response time of the slave control devices is the respective response time in said previous broadcasting.

3. For the non-first broadcasting of the master control device in "broadcasting scheme 2", the response time of the slave control device can be obtained according to the following steps: determining the response time according to the response result of all the slave control devices in the previous broadcasting, specifically as follows.

If multiple slave control devices responded successfully in the previous broadcasting, the response time of the slave control devices that responded successfully is a time point delayed by a time $T_{110}$ from when it is detected that the communication bus is idle, and the response time of the slave control devices that failed to respond is a time point delayed by a time $T_{210}$ from when it is detected that the communication bus is idle, wherein $T_{110} < T_{210}$; for example, $T_{110} = 15$ ms, and $T_{210} = 20$ ms.

If all the slave control devices failed to respond in the previous broadcasting, the response time of the slave control devices is the respective response time in said previous broadcasting.

Figure 2:
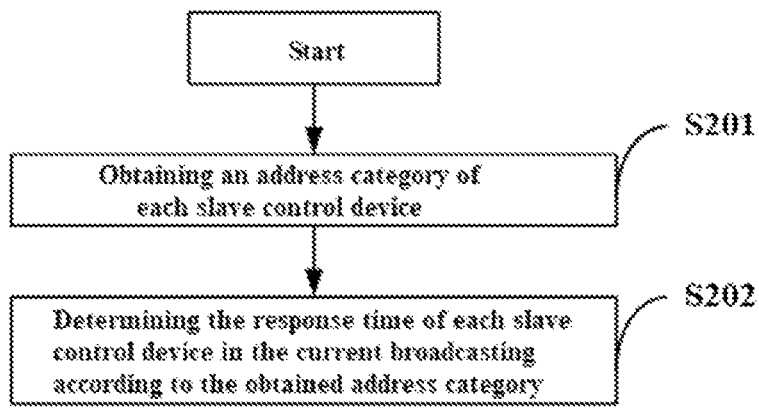
FIG. 2 is a schematic view showing main steps of a method of obtaining a response time of a slave control device in an embodiment of the present disclosure.

Next, reference is made to FIG. 2, which exemplarily shows main steps of another method of obtaining the response time of the slave control device in this embodiment. As shown in FIG. 2, in order to improve a responding speed of the slave control device, the address competition method shown in FIG. 1 may also determine its response time according to an address category of the slave control device, which specifically includes the following steps.

Step S201: obtaining an address category of each slave control device.

The address category in this embodiment includes a first address category, a second address category and a third address category; the first address category indicates that the slave control device has been permanently allocated a communication address and therefore no longer participates in broadcast responding; the second address category indicates that multiple slave control devices successfully responded in the multiple times of consecutive broadcastings and are therefore temporarily allocated communication addresses; and the third address category indicates that no slave control device responded or the slave control devices failed to respond during the multiple times of consecutive broadcastings.

Step S202: determining the response time of each slave control device in the current broadcasting according to the obtained address category. Specifically, the response time of the slave control device of the second address category may be set to be shorter than the response time of the slave control device of the third address category.

For example, in the first broadcasting of multiple times of consecutive broadcastings, the slave control devices 1 to 3 responded successfully, and the slave control devices 4 to 5 failed to respond. In this case, the address categories of the slave control devices 1 to 3 are updated to the second address category, and the address categories of the slave control devices 4 to 5 are updated to the third address category. In the next broadcasting, the slave control devices 1 to 3 will respond preferentially, and the slave control devices 4 to 5 can respond only after the control devices 1 to 3 start to respond.

When the address competition method shown in FIG. 1 is implemented by a computer program code, the use of this embodiment to obtain the response time can increase an execution speed of the computer program code, thereby increasing the address competition speed of the entire multi-connection control system.

Step S103: in a case where only one slave control device responded successfully, allocating an address specified by the address broadcasting signal as a communication address to the slave control device that responded successfully.

Figure 3:
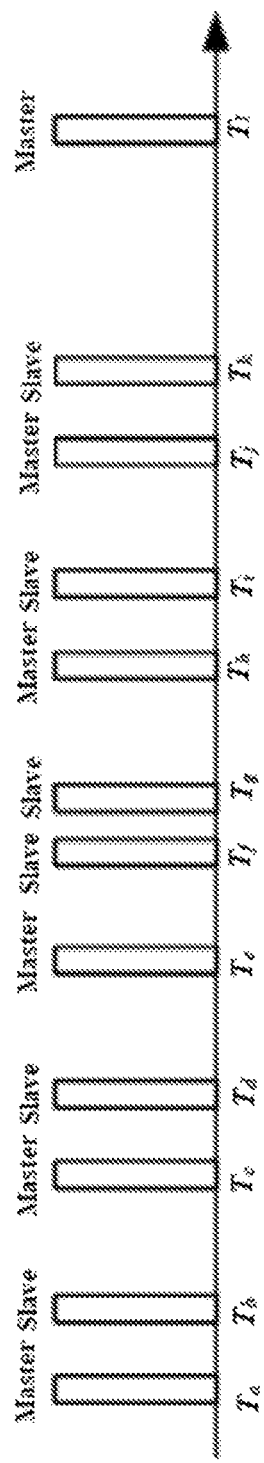
FIG. 3 is a schematic view of a communication time-sequence of a communication bus in an embodiment of the present disclosure.

Reference is made to FIG. 3, which exemplarily shows a bus communication time-sequence including a broadcasting time-sequence of the master control device and a responding time-sequence of the slave control device in this embodiment. In this embodiment, the multi-connection control system includes a master control device and slave control devices 1 to 4. The master control device uses "broadcasting scheme 2" to broadcast each address in the preset address segment. The preset address segment is composed of addresses 1 to 4. The status at each time point of the bus communication time-sequence shown in FIG. 3 is given below:

Time point $T_a$ ($T_a = 10$ ms): The master control device broadcasts address 1.

Time point $T_b$ ($T_b = 20$ ms): The slave control devices 1 to 4 respond according to the broadcasting signal of address 1, and only the slave control device 1 responds successfully, so address 1 is used as the communication address of the slave control device 1.

Time point $T_c$ ($T_c = 40$ ms): The master control device broadcasts address 2.

Time point $T_d$ ($T_d = 50$ ms): The slave control devices 2 to 4 respond according to the broadcasting signal of address 2, the slave control devices 2 to 3 respond successfully, and the slave control device 4 fails to respond.

Time point $T_e$ ($T_e = 70$ ms): The master control device broadcasts address 2 again.

Time point $T_f$ ($T_f = 85$ ms): The slave control devices 2 to 3 respond according to the broadcasting signal of address 2, and the slave control device 2 responds successfully, so address 2 is used as the communication address of the slave control device 2.

Time point $T_g$ ($T_g$=90 ms): The slave control device 4 responds according to the broadcasting signal of address 2. After it is detected during the responding process that there is a slave control device starting to respond, the slave control device 4 immediately stops responding.

Time point $T_h$ ($T_h$=110 ms): The master control device broadcasts address 3.

Time point $T_i$ ($T_i$=120 ms): The slave control devices 3 to 4 respond according to the broadcasting signal of address 3, and the slave control device 3 responds successfully, so address 3 is used as the communication address of the slave control device 3.

Time point $T_j$ ($T_j$=140 ms): The master control device broadcasts address 4.

Time point $T_k$ ($T_k$=150 ms): The slave control device 4 responds according to the broadcasting signal of address 4, and responds successfully, so address 4 is used as the communication address of the slave control device 4.

Time point $T_l$ ($T_l$=190 ms): Broadcastings of all addresses are completed and a new communication process is started.

In a non-first broadcasting, the slave control device may determine the response time according to the response result of the previous broadcasting. The responding time-sequence of all slave control devices is adjusted based on the response result, that is, the slave control device that has successfully responded in the current broadcasting will respond preferentially in the next broadcasting, so that the master control device can quickly complete address allocation.

Although the various steps have been described in the above order in the foregoing embodiments, those skilled in the art can understand that in order to achieve the effects of the embodiments, different steps need not be executed in such an order. They can be executed simultaneously (in parallel) or in a reverse order, and these simple changes are all within the scope of protection of the present disclosure.

Those skilled in the art can understand that although some embodiments described herein include certain features included in other embodiments rather than other features, the combination of features of different embodiments means that they are within the scope of the present disclosure and form different embodiments. For example, in the claims of the present disclosure, any one of the claimed embodiments can be used in any combination.

It should be noted that the above embodiments illustrate the present disclosure rather than limit the present disclosure, and those skilled in the art can design alternative embodiments without departing from the scope of the appended claims. In the claims, any reference signs placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be implemented by means of hardware comprising several different elements and by means of a suitably programmed PC. In a unit claims enumerating several devices, several of these devices may be embodied by the same hardware item. The use of the words "first", "second", "third" and the like does not indicate any order. These words can be interpreted as names.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principle of the present disclosure, those skilled in the art can make equivalent changes or replacements to relevant technical features, and the technical solutions after these changes or replacements will fall within the scope of protection of the present disclosure.

What is claimed is:

1. An address competition method of a multi-connection control system, the multi-connection control system comprising a master control device and a plurality of slave control devices, and the master control device being connected with the plurality of slave control devices respectively, the address competition method comprising:
   sequentially broadcasting, by the master control device, each address in a preset address segment by sending address broadcasting signals to the slave control devices;
   responding to, by all the slave control devices, the master control device according to a preset response time and the current number of broadcasting times of the master control device; and
   in a case where only one slave control device responded successfully, allocating an address specified by the address broadcasting signal as a communication address to the slave control device that responded successfully,
   wherein the preset response time depends on whether the corresponding slave control device has been temporarily allocated a communication address;
   wherein the master control device performs multiple times of consecutive broadcastings on each address in the preset address segment; or
   the master control device performs consecutive broadcastings on corresponding addresses only when multiple slave control devices responded successfully or all the slave control devices failed to respond during a first broadcasting;
   wherein a method of obtaining a response time of the slave control device in the first broadcasting comprises:
   judging whether the slave control device has been temporarily allocated a communication address: if yes, the response time is a time point delayed by a time $T_1$ from when it is detected that a communication bus is idle; and if not, the response time is a time point delayed by a time $T_2$ from when it is detected that the communication bus is idle, wherein $T_1 < T_2$.

2. The address competition method according to claim 1, wherein the responding to, by all the slave control devices, the master control device according to a preset response time and the current number of broadcasting times of the master control device comprises:
   generating a random number by each slave control device upon receiving the address broadcasting signal, and sending the generated random number by each slave control device to the master control device.

3. The address competition method according to claim 1, wherein when the master control device performs multiple times of consecutive broadcastings on each address in the preset address segment, a method of obtaining a response time of the slave control device in a non-first broadcasting comprises:
   if one slave control device responded successfully in a previous broadcasting, the response time of the slave control device that responded successfully is a time point delayed by a time $T_{10}$ from when it is detected that the communication bus is idle, and the response time of the slave control devices that failed to respond is a time point delayed by a time $T_{20}$ from when it is detected that the communication bus is idle, wherein $T_{10}<T_{20}$;

if multiple slave control devices responded successfully in the previous broadcasting, the response time of the slave control devices that responded successfully is a time point delayed by a time $T_{100}$ from when it is detected that the communication bus is idle, and the response time of the slave control devices that failed to respond is a time point delayed by a time $T_{200}$ from when it is detected that the communication bus is idle, wherein $T_{100}<T_{200}$; and if all the slave control devices failed to respond in the previous broadcasting, the response time of the slave control devices is the respective response time in said previous broadcasting.

4. The address competition method according to claim 1, wherein when the master control device performs consecutive broadcastings on corresponding addresses only when multiple slave control devices responded successfully or all the slave control devices failed to respond during the first broadcasting, a method of obtaining a response time of the slave control device in a non-first broadcasting comprises:

if multiple slave control devices responded successfully in a previous broadcasting, the response time of the slave control devices that responded successfully is a time point delayed by a time $T_{110}$ from when it is detected that the communication bus is idle, and the response time of the slave control devices that failed to respond is a time point delayed by a time $T_{210}$ from when it is detected that the communication bus is idle, wherein $T_{110}<T_{210}$; and if all the slave control devices failed to respond in the previous broadcasting, the response time of the slave control devices is the respective response time in said previous broadcasting.

5. The address competition method according to claim 1, wherein when the master control device performs multiple times of consecutive broadcastings on a certain address in the preset address segment, the address competition method further comprises:

obtaining an address category of each slave control device; and determining a response time of each slave control device in the current broadcasting according to the obtained address category, wherein the address category comprises a first address category, a second address category and a third address category; the first address category indicates that the slave control device has been permanently allocated a communication address and therefore no longer participates in broadcast responding; the second address category indicates that multiple slave control devices responded successfully in the multiple times of consecutive broadcastings and are therefore temporarily allocated communication addresses; and the third address category indicates that no slave control device responded or the slave control devices failed to respond during the multiple times of consecutive broadcastings.

6. The address competition method according to claim 5, wherein the step of determining a response time of each slave control device in the current broadcasting according to the obtained address category comprises: setting the response time of the slave control device of the second address category to be shorter than the response time of the slave control device of the third address category.

7. The address competition method according to claim 1, further comprising:

if the master control device has performed multiple times of consecutive broadcastings on a certain address in the preset address segment, but eventually all the slave control devices failed to respond, broadcasting the next address according to a set sequence.

8. The address competition method according to claim 1, further comprising:

when the master control device performs multiple times of consecutive broadcastings on a certain address in the preset address segment, if the number of successful responding of the same slave control device is greater than a preset threshold and the address has been initially allocated to the slave control device, setting a status flag of the slave control device as a device presence flag.

* * * * *